United States Patent
Dubois

(10) Patent No.: US 10,535,898 B2
(45) Date of Patent: Jan. 14, 2020

(54) NONAQUEOUS ELECTROLYTE COMPOSITIONS COMPRISING LITHIUM MALONATOBORATE AND FLUORINATED SOLVENT

(71) Applicant: Solvay SA, Brussels (BE)

(72) Inventor: Charles J. Dubois, Orange, TX (US)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 14/968,933

(22) Filed: Dec. 15, 2015

(65) Prior Publication Data

US 2016/0181660 A1 Jun. 23, 2016

Related U.S. Application Data

(60) Provisional application No. 62/197,747, filed on Jul. 28, 2015, provisional application No. 62/092,911, filed on Dec. 17, 2014.

(51) Int. Cl.

| | |
|---|---|
| *H01M 10/0525* | (2010.01) |
| *H01M 10/0567* | (2010.01) |
| *H01M 10/0569* | (2010.01) |
| *H01M 4/48* | (2010.01) |
| *H01M 4/50* | (2010.01) |
| *H01M 4/587* | (2010.01) |
| *H01M 4/485* | (2010.01) |
| *H01M 4/505* | (2010.01) |

(52) U.S. Cl.
CPC ... *H01M 10/0567* (2013.01); *H01M 10/0525* (2013.01); *H01M 10/0569* (2013.01); *H01M 4/485* (2013.01); *H01M 4/505* (2013.01); *H01M 4/587* (2013.01); *H01M 2300/0034* (2013.01); *H01M 2300/0037* (2013.01)

(58) Field of Classification Search
CPC ......... H01M 10/0525; H01M 10/0567; H01M 10/0568; H01M 10/0569; H01M 2300/0025; H01M 2300/0034
See application file for complete search history.

(56) References Cited

U.S. PATENT DOCUMENTS

| | | | |
|---|---|---|---|
| 5,738,957 A | 4/1998 | Amine et al. | |
| 5,962,166 A | 10/1999 | Ein-Eli et al. | |
| 6,679,926 B1* | 1/2004 | Kajiura ............... | H01M 4/0402 264/614 |
| 6,680,145 B2 | 1/2004 | Obrovac et al. | |
| 6,964,828 B2 | 11/2005 | Lu et al. | |
| 7,026,070 B2 | 4/2006 | Noguchi et al. | |
| 7,078,128 B2 | 7/2006 | Lu et al. | |
| 7,303,840 B2* | 12/2007 | Thackeray ......... | C01G 45/1221 423/599 |
| 7,381,496 B2 | 6/2008 | Onnerud et al. | |
| 7,468,223 B2 | 12/2008 | Thackeray et al. | |
| 7,541,114 B2 | 6/2009 | Ohzuku et al. | |
| 7,718,319 B2 | 5/2010 | Manthiram et al. | |
| 7,981,544 B2 | 7/2011 | Morishima | |
| 8,389,160 B2 | 3/2013 | Venkatachalam et al. | |
| 8,394,534 B2 | 3/2013 | Lopez et al. | |
| 8,535,832 B2 | 9/2013 | Karthikeyan et al. | |
| 2003/0157413 A1* | 8/2003 | Chen .................. | H01M 10/052 429/326 |
| 2003/0180626 A1* | 9/2003 | Shima ............... | H01M 10/0525 429/326 |
| 2006/0236528 A1* | 10/2006 | Xu ..................... | H01M 10/0568 29/623.1 |
| 2009/0092892 A1* | 4/2009 | Yamaguchi ............. | H01M 4/13 429/125 |
| 2010/0035162 A1* | 2/2010 | Chiga ................. | H01M 10/052 429/343 |
| 2010/0310943 A1* | 12/2010 | Koh ...................... | H01M 6/164 429/332 |
| 2011/0008681 A1* | 1/2011 | Koh ...................... | H01G 9/038 429/331 |
| 2011/0020710 A1* | 1/2011 | Iwayasu ............ | H01M 10/0567 429/324 |
| 2011/0200886 A1* | 8/2011 | Deguchi ............... | H01M 4/133 429/331 |
| 2012/0149852 A1 | 6/2012 | Dennes et al. | |

FOREIGN PATENT DOCUMENTS

| | | | |
|---|---|---|---|
| WO | 2009/040367 A1 | | 4/2009 |
| WO | WO 2013/033579 | * | 3/2013 |

OTHER PUBLICATIONS

Yang, L., Zhang, H., Driscoll, P.F., Lucht, B., Kerr, J.B.—Six-Membered-Ring Malonatoborate-Based Lithium Salts as Electrolytes for Lithium Ion Batteries, ECCS Transactions, 33 (39), pp. 57-69, 2011.*

Liu, Jun, et al., "Understanding the Improved Electrochemical Performances of Fe-Substituted 5 V Spinel Cathode LiMn1.5Ni0.5O4"; J. Phys. Chem. C 2009, 113, pp. 15073-15079. [Cited on p. 19 of the Specification as filed.]

(Continued)

*Primary Examiner* — Anca Eoff
(74) *Attorney, Agent, or Firm* — Osha Liang LLP

(57) ABSTRACT

Disclosed herein are electrolyte compositions comprising: a non-fluorinated carbonate; a fluorinated solvent; a lithium bis(malonato) borate compound represented by the formula:

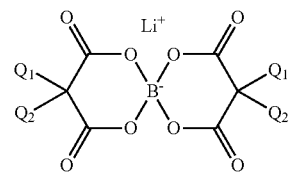

wherein each $Q_1$ and $Q_2$ is independently a hydrogen, alkyl, allyl, acetylenic, aryl, or propargyl group; a fluorinated carbonate; and an electrolyte salt. The electrolyte compositions are useful in electrochemical cells, such as lithium ion batteries.

14 Claims, No Drawings

(56) References Cited

OTHER PUBLICATIONS

Yoon, Sukeun, et al., "Sb—MOx—C (M = Al, Tl, or Mo) Nanocomposite Anodes for Lithium-Ion Batteries"; Chem. Mater. 2009, 21, pp. 3898-3904. [Cited on p. 20 of the Specification as filed.]

\* cited by examiner

NONAQUEOUS ELECTROLYTE COMPOSITIONS COMPRISING LITHIUM MALONATOBORATE AND FLUORINATED SOLVENT

CROSS-REFERENCE TO RELATED APPLICATIONS

This application claims the benefit of U.S. Provisional Application Nos. 62/092,911 filed on Dec. 17, 2014, and 62/197,747 filed on Jul. 28, 2015, which are incorporated herein by reference in their entirety.

TECHNICAL FIELD

The disclosure herein relates to electrolyte compositions containing a fluorinated solvent and a lithium malonatoborate, which are useful in electrochemical cells, such as lithium ion batteries.

BACKGROUND

With the advancement in portable electronic devices and intense interest in plug-in hybrid electric vehicles, there is great demand to increase the energy and power capabilities of lithium ion batteries. In this regard, increasing the operational voltage is a viable strategy. Current lithium ion battery electrolyte solvents typically contain one or more linear carbonates, such as ethyl methyl carbonate, dimethyl carbonate, or diethyl carbonate; and a carbonate, such as ethylene carbonate. However, at cathode potentials above 4.2 V these electrolyte can decompose, which can result in a loss of battery performance. What is needed is a formulation that combines solvent(s) with additive(s) that will have improved cycling performance at high temperature when used in a lithium ion battery, particularly such a battery that operates with a high potential cathode.

SUMMARY

Disclosed herein are electrolyte compositions comprising:
a) a non-fluorinated carbonate;
b) a fluorinated solvent;
c) a lithium bis(malonato) borate compound represented by the formula:

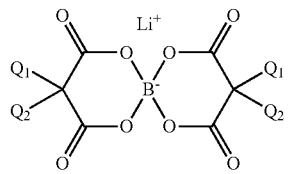

wherein each $Q_1$ and $Q_2$ is independently a hydrogen, alkyl, allyl, acetylenic, aryl, or propargyl group;
d) a fluorinated carbonate; and
e) an electrolyte salt.

The non-fluorinated carbonate may be cyclic or acyclic. The fluorinated solvent may be a fluorinated acyclic carboxylic acid ester, a fluorinated acyclic carbonate, a fluorinated acyclic ether, or mixtures thereof. In one embodiment, the fluorinated carbonate is a cyclic fluorinated carbonate.

In one embodiment there is a provided a method to prepare an electrolyte composition, the method comprising combining: a) the non-fluorinated carbonate; b) the fluorinated solvent; c) the lithium bis(malonato) borate; d) the fluorinated carbonate; and e) the electrolyte salt, as defined herein, to form an electrolyte composition.

In another embodiment, there is provided herein an electrochemical cell comprising an electrolyte composition disclosed herein. In a further embodiment, the electrochemical cell is a lithium ion battery.

DETAILED DESCRIPTION

As used above and throughout the disclosure, the following terms, unless otherwise indicated, shall be defined as follows:

The term "electrolyte composition" as used herein, refers to a chemical composition suitable for use as an electrolyte in an electrochemical cell.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

The term "anode" refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

The term "cathode" refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge and from the cathode to the anode during charge.

Equilibrium potential between lithium and lithium ion is the potential of a reference electrode using lithium metal in contact with the nonaqueous electrolyte containing lithium salt at a concentration sufficient to give about 1 mole/liter of lithium ion concentration, and subjected to sufficiently small currents so that the potential of the reference electrode is not significantly altered from its equilibrium value (Li/Li$^+$). The potential of such a Li/Li$^+$ reference electrode is assigned here the value of 0.0V. Potential of an anode or cathode means the potential difference between the anode or cathode and that of a Li/Li$^+$ reference electrode. Herein voltage means the voltage difference between the cathode and the anode of a cell, neither electrode of which may be operating at a potential of 0.0V.

The term "carbonate" as used herein refers specifically to an organic carbonate, wherein the organic carbonate is a dialkyl diester derivative of carbonic acid, the organic carbonate having a general formula R'OCOOR", wherein R' and R" are each independently selected from alkyl groups having at least 1 carbon atom, wherein the alkyl substituents can be the same or different, can be saturated or unsaturated, substituted or unsubstituted, can form a cyclic structure via interconnected atoms, or include a cyclic structure as a substituent of either or both of the alkyl groups.

The term "alkyl group", as used herein, refers to a linear or branched chain hydrocarbon group containing no unsaturation.

The term "fluoroalkyl group", as used herein, refers to an alkyl group wherein at least one hydrogen is replaced by fluorine.

Disclosed herein are electrolyte compositions comprising:
a) a non-fluorinated carbonate;
b) a fluorinated solvent;
c) a lithium bis(malonato) borate compound represented by the formula:

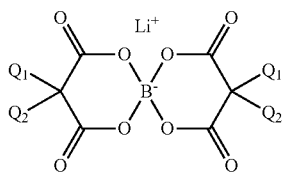

wherein each $Q_1$ and $Q_2$ is independently a hydrogen, alkyl, allyl, acetylenic, aryl, or propargyl group;
d) a fluorinated carbonate; and
e) an electrolyte salt.

As used herein, the terms "fluorinated carbonate" and "fluorinated solvent" refer to different compounds, that is, not the same chemical compound.

One or more non-fluorinated carbonates may be used in the electrolyte composition. The non-fluorinated carbonate may be cyclic or acyclic. Suitable non-fluorinated carbonates include ethylene carbonate, ethyl methyl carbonate, dimethyl carbonate, diethyl carbonate, vinylene carbonate, di-tert-butyl carbonate, vinylethylene carbonate, dimethylvinylene carbonate, propylene carbonate, ethyl propyl vinylene carbonate, dimethylvinylene carbonate, or mixtures thereof. In one embodiment the non-fluorinated carbonate comprises ethylene carbonate, propylene carbonate, or mixtures thereof. In one embodiment, the non-fluorinated carbonate comprises ethylene carbonate. In one embodiment, the non-fluorinated carbonate comprises propylene carbonate. In one embodiment, the non-fluorinated carbonate comprises ethyl methyl carbonate. In one embodiment, the non-fluorinated carbonate comprises dimethyl carbonate.

In another embodiment the non-fluorinated cyclic carbonate comprises a mixture of ethylene carbonate and vinylene carbonate, where the vinylene carbonate makes up 0.2 to 3% of the weight of the formulated electrolyte.

In the electrolyte compositions disclosed herein, the non-fluorinated carbonate or mixtures thereof can be used in various amounts depending on the desired properties of the electrolyte composition. In one embodiment, the non-fluorinated carbonate(s) in combination is present in the electrolyte composition in the range of about 0.5 percent to about 95 percent by weight of the electrolyte composition, or about 5 percent to about 95 percent, or about 10 percent to about 80 percent, or about, 20 percent to about 40 percent, or about 25 percent to about 35 percent by weight of the electrolyte composition. In another embodiment, the non-fluorinated carbonate is present in the range of about 0.5 percent to about 10 percent by weight, or about 1 percent to about 10 percent, or about 5 percent to about 10 percent by weight of the electrolyte composition.

The fluorinated solvent may be a fluorinated acyclic carboxylic acid ester, a fluorinated acyclic carbonate, a fluorinated acyclic ether, or mixtures thereof. One or more fluorinated solvents may be used in the electrolyte composition. In one embodiment, the fluorinated solvent is a fluorinated acyclic carboxylic acid ester. In one embodiment, the fluorinated solvent is a fluorinated acyclic carbonate. In one embodiment, the fluorinated solvent is a fluorinated acyclic ether.

Suitable fluorinated acyclic carboxylic acid esters are represented by the formula $$R^1-COO-R^2$$

wherein
i) $R^1$ is H, an alkyl group, or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms.

In one embodiment, $R^1$ is H and $R^2$ is a fluoroalkyl group. In one embodiment, $R^1$ is an alkyl group and $R^2$ is a fluoroalkyl group. In one embodiment, $R^1$ is a fluoroalkyl group and $R^2$ is an alkyl group. In one embodiment, $R^1$ is a fluoroalkyl group and $R^2$ is a fluoroalkyl group, and $R^1$ and $R^2$ can be either the same as or different from each other. In one embodiment, $R^1$ comprises one carbon atom. In one embodiment, $R^1$ comprises two carbon atoms.

In another embodiment, $R^1$ and $R^2$ are as defined herein above, and $R^1$ and $R^2$, taken as a pair, comprise at least two carbon atoms but not more than seven carbon atoms and further comprise at least two fluorine atoms, with the proviso that neither $R^1$ nor $R^2$ contains a $FCH_2$— group or a —FCH— group.

In one embodiment, the number of carbon atoms in $R^1$ in the formula above is 1, 3, 4, or 5.

Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), $HCF_2$—$CH_2$—$CH_2$—COO—$CH_2CH_3$ (ethyl 4,4-difluorobutanoate, CAS No. 1240725-43-2), $CH_3$—COO—$CH_2CF_3$ (2,2,2-trifluoroethyl acetate, CAS No. 406-95-1), H—COO—$CH_2CF_2H$ (difluoroethyl formate, CAS No. 1137875-58-1), H—COO—$CH_2CF_3$ (trifluoroethyl formate, CAS No. 32042-38-9), and mixtures thereof. In one embodiment, the fluorinated acyclic carboxylic acid ester comprises 2,2-difluoroethyl acetate ($CH_3$—COO—$CH_2CF_2H$). In one embodiment, the fluorinated acyclic carboxylic acid ester comprises 2,2-difluoroethyl propionate ($CH_3CH_2$—COO—$CH_2CF_2H$). In one embodiment, the fluorinated acyclic carboxylic acid ester comprises 2,2,2-trifluoroethyl acetate ($CH_3$—COO—$CH_2CF_3$). In one embodiment, the fluorinated acyclic carboxylic acid ester comprises 2,2-difluoroethyl formate (H—COO—$CH_2CF_2H$).

Suitable fluorinated acyclic carbonates are represented by the formula:

$$R^3-OCOO-R^4$$

wherein
i) $R^3$ is a fluoroalkyl group;
ii) $R^4$ is an alkyl group or a fluoroalkyl group; and
iii) $R^3$ and $R^4$ taken as a pair comprise at least two carbon atoms but not more than seven carbon atoms.

In one embodiment, $R^3$ is a fluoroalkyl group and $R^4$ is an alkyl group. In one embodiment, $R^3$ is a fluoroalkyl group and $R^4$ is a fluoroalkyl group, and $R^3$ and $R^4$ can be either the same as or different from each other. In one embodiment, $R^3$ and $R^4$ independently can be branched or linear. In one embodiment, $R^3$ comprises one carbon atom. In one embodiment, $R^3$ comprises two carbon atoms.

In another embodiment, $R^3$ and $R^4$ are as defined herein above, and $R^3$ and $R^4$, taken as a pair, comprise at least two carbon atoms but not more than seven carbon atoms and further comprise at least two fluorine atoms, with the proviso that neither $R^3$ nor $R^4$ contains a $FCH_2$— group or a —FCH— group.

Examples of suitable fluorinated acyclic carbonates include without limitation $CH_3$—OC(O)O—$CH_2CF_2H$ (methyl 2,2-difluoroethyl carbonate, CAS No. 916678-13-2), $CH_3$—OC(O)O—$CH_2CF_3$ (methyl 2,2,2-trifluoroethyl carbonate, CAS No. 156783-95-8), $CH_3$—OC(O)O—$CH_2CF_2CF_2H$ (methyl 2,2,3,3-tetrafluoropropyl carbonate, CAS No. 156783-98-1), $HCF_2CH_2$—OCOO—$CH_2CH_3$ (2,2-difluoroethyl ethyl carbonate, CAS No. 916678-14-3), and $CF_3CH_2$—OCOO—$CH_2CH_3$ (2,2,2-trifluoroethyl ethyl carbonate, CAS No. 156783-96-9).

Suitable fluorinated acyclic ethers are represented by the formula:

$R^5$—O—$R^6$ wherein
  i) $R^5$ is a fluoroalkyl group;
  ii) $R^6$ is an alkyl group or a fluoroalkyl group; and
  iii) $R^5$ and $R^6$ taken as a pair comprise at least two carbon atoms but not more than seven carbon atoms.

In one embodiment, $R^5$ is a fluoroalkyl group and $R^6$ is an alkyl group. In one embodiment, $R^5$ is a fluoroalkyl group and $R^6$ is a fluoroalkyl group, and $R^5$ and $R^6$ can be either the same as or different from each other. In one embodiment, $R^5$ and $R^6$ independently can be branched or linear. In one embodiment, $R^5$ comprises one carbon atom. In one embodiment, $R^5$ comprises two carbon atoms.

In another embodiment, $R^5$ and $R^6$ are as defined herein above, and $R^5$ and $R^6$, taken as a pair, comprise at least two carbon atoms but not more than seven carbon atoms and further comprise at least two fluorine atoms, with the proviso that neither $R^5$ nor $R^6$ contains a $FCH_2$— group or a —FCH— group.

Examples of suitable fluorinated acyclic ethers include without limitation $HCF_2CF_2CH_2$—O—$CF_2CF_2H$ (CAS No. 16627-68-2) and $HCF_2CH_2$—O—$CF_2CF_2H$ (CAS No. 50807-77-7).

A mixture of two or more of these fluorinated acyclic carboxylic acid ester, fluorinated acyclic carbonate, and/or fluorinated acyclic ether solvents may also be used. As used herein, the term "mixtures" encompasses both mixtures within and mixtures between solvent classes, for example mixtures of two or more fluorinated acyclic carboxylic acid esters, and also mixtures of fluorinated acyclic carboxylic acid esters and fluorinated acyclic carbonates, for example. Non-limiting examples include a mixture of 2,2-difluoroethyl acetate and 2,2-difluoroethyl propionate, or a mixture of 2,2-difluoroethyl acetate and 2,2 difluoroethyl methyl carbonate.

In one embodiment, the fluorinated solvent is:
  a) a fluorinated acyclic carboxylic acid ester represented by the formula:

$R^1$—COO—$R^2$, b) a fluorinated acyclic carbonate represented by the formula:

$R^3$—OCOO—$R^4$, c) a fluorinated acyclic ether represented by the formula:

$R^5$—O—$R^6$, or mixtures thereof;
wherein
  i) $R^1$ is H, an alkyl group, or a fluoroalkyl group;
  ii) $R^3$ and $R^5$ is each independently a fluoroalkyl group and can be either the same as or different from each other;
  iii) $R^2$, $R^4$, and $R^6$ is each independently an alkyl group or a fluoroalkyl group and can be either the same as or different from each other;
  iv) either or both of $R^1$ and $R^2$ comprises fluorine; and
  v) $R^1$ and $R^2$, $R^3$ and $R^4$, and $R^5$ and $R^6$, each taken as a pair, comprise at least two carbon atoms but not more than seven carbon atoms.

In another embodiment, the fluorinated solvent is
  a) a fluorinated acyclic carboxylic acid ester represented by the formula:

$R^1$—COO—$R^2$, b) a fluorinated acyclic carbonate represented by the formula:

$R^3$—OCOO—$R^4$, c) a fluorinated acyclic ether represented by the formula:

$R^5$—O—$R^6$, or mixtures thereof;
wherein
  i) $R^1$ is H, an alkyl group, or a fluoroalkyl group;
  ii) $R^3$ and $R^5$ is each independently a fluoroalkyl group and can be either the same as or different from each other;
  iii) $R^2$, $R^4$, and $R^6$ is each independently an alkyl group or a fluoroalkyl group and can be either the same as or different from each other;
  iv) either or both of $R^1$ and $R^2$ comprises fluorine; and
  v) $R^1$ and $R^2$, $R^3$ and $R^4$, and $R^5$ and $R^6$, each taken as a pair, comprise at least two carbon atoms but not more than seven carbon atoms and further comprise at least two fluorine atoms, with the proviso that none of $R^1$, $R^2$, $R^3$, $R^4$, $R^5$, nor $R^6$ contains a $FCH_2$— group or a —FCH— group.

In the electrolyte compositions disclosed herein, the fluorinated solvent or mixtures thereof can be used in various amounts depending on the desired properties of the electrolyte composition. In some embodiments, the electrolyte composition comprises from about 5 weight percent to about 95 weight percent of the fluorinated solvent. In some embodiments, the electrolyte composition comprises from about 10 weight percent to about 90 weight percent, or from about 10 weight percent to about 80 weight percent, or from about 20 weight percent to about 80 weight percent, or from about 30 weight percent to about 80 weight percent, or from about 40 weight percent to about 80 weight percent, or from about 50 weight percent to about 80 weight percent, or from about 60 weight percent to about 80 weight percent fluorinated solvent. In some embodiments, the fluorinated solvent is present in the electrolyte composition in a percentage by weight that is defined by a lower limit and an upper limit. The lower limit of the range is 5, 10, 20, 25, 30, 35, 40, 45, 50, 55, 60, or 65 and the upper limit of the range is 70, 75, 80, 85, 90, 95, 96, 97, 98, or 99. All percentages by weight are based on the total weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of $HCF_2CF_2CH_2$—O—$CF_2CF_2H$ can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields $HCF_2CH_2$—O—$CF_2CF_2H$. Alternatively, some of these fluorinated solvents may be obtained commercially. For best results, it is desirable to purify the fluorinated acyclic carboxylic esters and fluorinated acyclic carbonates to a purity level of at least about 99.9%, for example at least about 99.99%. These fluorinated solvents may be purified using distillation methods such as vacuum distillation or spinning band distillation.

The electrolyte compositions disclosed herein also comprise a fluorinated carbonate that is different than the fluorinated solvent. In one embodiment, the fluorinated carbonate is a cyclic fluorinated carbonate. In one embodiment, suitable cyclic fluorinated carbonates can be represented by the following structure

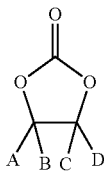

wherein
i) each of A, B, C, and D is H, F, a saturated or unsaturated $C_1$ to $C_4$ alkyl group, or a saturated or unsaturated $C_1$ to $C_4$ fluoroalkyl group, and can be the same as or different from each other; and
ii) at least one of A, B, C, and D comprises fluorine.
The term "unsaturated", as used herein, refers to an olefinically unsaturated group containing at least one carbon-carbon double bond.

Suitable cyclic fluorinated carbonates include 4-fluoroethylene carbonate (abbreviated as FEC, also known as 4-fluoro-1,3-dioxolan-2-one), difluoroethylene carbonate isomers, trifluoroethylene carbonate isomers, tetrafluoroethylene carbonate, 2,2,3,3-tetrafluoropropyl methyl carbonate, bis(2,2,3,3-tetrafluoropropyl) carbonate, bis(2,2,2-trifluoroethyl) carbonate, 2,2,2-trifluoroethyl methyl carbonate, bis(2,2-difluoroethyl) carbonate, 2,2-difluoroethyl methyl carbonate, methyl 2,3,3-trifluoroallyl carbonate, or mixtures thereof. In one embodiment the fluorinated carbonate comprises fluoroethylene carbonate. In one embodiment, the fluorinated carbonate comprises 4-fluoro-1,3-dioxolan-2-one; 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; or mixtures thereof.

In one embodiment, the electrolyte composition comprises about 0.01 weight percent to about 10 weight percent, or about 0.1 weight percent to about 5 weight percent, or about 0.5 weight percent to about 3 weight percent, or about 1 weight percent to about 3 weight percent or about 1.5 weight percent to about 2.5 weight percent, or about 2 weight percent, fluorinated carbonate, based on the total weight of the electrolyte composition.

The electrolyte compositions disclosed herein also comprise a lithium bis(malonato) borate compound represented by the formula:

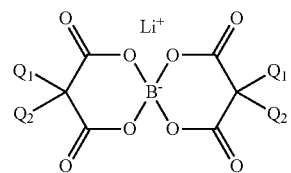

wherein each $Q_1$ and $Q_2$ is independently a hydrogen, alkyl, allyl, acetylenic, aryl, or propargyl group. The alkyl, aryl, vinyl ($H_2C$=CH—), allyl ($H_2C$=CH—$CH_2$—), acetylenic (HC≡C—), or propargyl (HC≡C—$CH_2$—) groups may each be unsubstituted or partially or totally fluorinated. Each of $Q_1$ and $Q_2$ can be the same or different, and two or three of $Q_1$ and $Q_2$ can together form a ring.

In one embodiment, each $Q_1$ and $Q_2$ is independently an alkyl group or hydrogen. In one embodiment, each $Q_1$ and $Q_2$ is independently an alkyl group. In another embodiment, the alkyl group is a $C_1$-$C_6$ alkyl group, linear or cyclic. In one embodiment, the alkyl group may be non-fluorinated, partially fluorinated, or totally fluorinated. In another embodiment, the alkyl group is a $C_1$-$C_6$ linear group, or a $C_1$-$C_3$ linear group. In another embodiment, the alkyl group is methyl, ethyl, allyl, or combinations thereof. In another embodiment, the alkyl group is unsubstituted. In one embodiment, each $Q_1$ and $Q_2$ is independently an aryl group. In another embodiment, the aryl group is phenyl. In another embodiment, the aryl group is unsubstituted. In one embodiment, each Q1 and Q2 is independently a methyl, ethyl, phenyl, or allyl group.

In one embodiment, the lithium bis(malonato) borate compound comprises bis(2,2-dimethylmalonato) borate, bis(malonato) borate, bis(ethylmethylmalonato) borate, or bis(allylmalonato) borate. In one embodiment, the lithium bis(malonato) borate compound comprises bis(2,2-dimethylmalonato) borate. In one embodiment, the lithium bis(malonato) borate compound comprises bis(malonato) borate. In one embodiment, the lithium bis(malonato) borate compound comprises bis(ethylmethylmalonato) borate. In one embodiment, the lithium bis(malonato) borate compound comprises bis(allylmalonato) borate.

In one embodiment the lithium bis(malonato) borate is present at about 0.01 weight percent to about 10 weight percent, or about 0.1 weight percent to about 5 weight percent, or about 0.5 weight percent to about 3 weight percent, or about 1 weight percent to about 3 weight percent or about 1.5 weight percent to about 2.5 weight percent, or about 2 weight percent, of the total electrolyte composition.

Other lithium borate salts may additionally be present, such as but not limited to lithium bis(oxalato)borate, lithium difluoro(oxalato)borate, lithium tetrafluoroborate, and mixtures thereof.

In one embodiment the electrolyte composition comprises about 0.5 weight percent to about 5 weight percent of a cyclic fluorinated carbonate and about 0.01 weight percent to about 5 weight percent of a lithium bis(malonato) borate, based on the weight of the electrolyte composition.

In some embodiments, the electrolyte composition comprises ethylene carbonate, 2,2-difluoroethyl acetate, a lithium bis(malonato) borate, and fluoroethylene carbonate. In some embodiments, the electrolyte composition comprises propylene carbonate, 2,2-difluoroethyl acetate, a lithium bis(malonato) borate, and fluoroethylene carbonate. In some embodiments, the electrolyte composition comprises ethyl methyl carbonate, 2,2-difluoroethyl acetate, a lithium bis(malonato) borate, and fluoroethylene carbonate.

In some embodiments, the electrolyte composition comprises dimethyl carbonate, 2,2-difluoroethyl acetate, a lithium bis(malonato) borate, and fluoroethylene carbonate.

The electrolyte compositions disclosed herein also contain at least one electrolyte salt. Suitable electrolyte salts include without limitation lithium hexafluorophosphate (LiPF$_6$),
lithium bis(trifluromethyl)tetrafluorophosphate (LiPF$_4$(CF$_3$)$_2$),
lithium bis(pentafluoroethyl)tetrafluorophosphate (LiPF$_4$(C$_2$F$_5$)$_2$),
lithium tris(pentafluoroethyl)trifluorophosphate (LiPF$_3$(C$_2$F$_5$)$_3$),
lithium bis(trifluoromethanesulfonyl)imide,
lithium bis(perfluoroethanesulfonyl)imide,
lithium (fluorosulfonyl) (nonafluorobutanesulfonyl)imide,
lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
Li$_2$B$_{12}$F$_{12-x}$H$_x$ where x is equal to 0 to 8, and
mixtures of lithium fluoride and anion receptors such as B(OC$_6$F$_5$)$_3$.

Mixtures of two or more of these or comparable electrolyte salts may also be used. In one embodiment, the electrolyte salt is lithium hexafluorophosphate. The electrolyte salt can be present in the electrolyte composition in an amount of about 0.2 to about 2.0 M, more particularly about 0.3 to about 1.5 M, and more particularly about 0.5 to about 1.2 M.

Electrolyte compositions disclosed herein can additionally or optionally comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included at an amount in the range of from about 0.05 weight percent to about 10 weight percent, alternatively from about 0.05 weight percent to about 5 weight percent of the electrolyte composition, or alternatively from about 0.5 weight percent to about 2 weight percent of the electrolyte composition.

Suitable gas-reduction additives that are known conventionally include, for example: halobenzenes such as fluorobenzene, chlorobenzene, bromobenzene, iodobenzene, or haloalkylbenzenes; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-1,2-naphthoquinone; 2-acetylfuran; 2-acetyl-5-methylfuran; 2-methyl imidazole1-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene; benzotriazole; perfluoroethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; CF$_3$COOCH$_2$C(CH$_3$)(CH$_2$OCO-CF$_3$)$_2$; CF$_3$COOCH$_2$CF$_2$CF$_2$CF$_2$CF$_2$CH$_2$OCOCF$_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine; 4,5-difluoro-1,3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane; and 1,1'-[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid such as lithium oxalate, B$_2$O$_5$, ZnO or other metal oxide, and fluorinated inorganic salts.

In another embodiment, there is provided herein an electrochemical cell comprising a housing, an anode and a cathode disposed in the housing and in ionically conductive contact with one another, an electrolyte composition, as described above, providing an ionically conductive pathway between the anode and the cathode, and a porous or microporous separator between the anode and the cathode. The housing may be any suitable container to house the electrochemical cell components. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, or a combination thereof. The pore size of the porous separator is sufficiently large to permit transport of ions, but small enough to prevent contact of the anode and cathode either directly or from particle penetration or dendrites which can from on the anode and cathode.

In another embodiment, the electrochemical cell is a lithium ion battery. Suitable cathode materials for a lithium ion battery include without limitation electroactive compounds comprising lithium and transition metals, such as LiCoO$_2$, LiNiO$_2$, LiMn$_2$O$_4$, LiCO$_{0.2}$Ni$_{0.2}$O$_2$ or LiV$_3$O$_8$;

Li$_a$CoG$_b$O$_2$ (0.90≤a≤1.8, and 0.001≤b≤0.1);
Li$_a$Ni$_b$Mn$_c$Co$_d$R$_e$O$_{2-f}$Z$_f$ where 0.8≤a≤1.2, 0.1≤b≤0.9, 0.0≤c≤0.7, 0.05≤d≤0.4, 0≤e≤0.2, wherein the sum of b+c+d+e is about 1, and 0≤f≤0.08;
Li$_a$A$_{1-b}$R$_b$D$_2$ (0.90≤a≤1.8 and 0≤b≤0.5);
Li$_a$E$_{1-b}$R$_b$O$_{2-c}$D$_c$ (0.90≤a≤1.8, 0≤b≤0.5 and 0≤c≤0.05);
Li$_a$Ni$_{1-b-c}$Co$_b$R$_c$O$_{2-d}$Z$_d$ where 0.9≤a≤1.8, 0≤b≤0.4, 0≤c≤0.05, and 0≤d≤0.05;

$Li_{1+z}Ni_{1-x-y}Co_xAl_yO_2$ where $0<x<0.3$, $0<y<0.1$, and $0<z<0.06$;

$LiNi_{0.5}Mn_{1.5}O_4$; $LiFePO_4$, $LiMnPO_4$, $LiCoPO_4$, and $LiVPO_4F$.

In one embodiment, the electroactive compound includes $Li_aNi_bMn_cCo_dR_eO_{2-f}Z_f$ as defined above with the exceptions that 0.1 b 0.5 and also $0.2 \le c \le 0.7$.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes and cathode active materials include those disclosed in U.S. Pat. Nos. 5,962,166; 6,680,145; 6,964,828; 7,026,070; 7,078,128; 7,303,840; 7,381,496; 7,468,223; 7,541,114; 7,718,319; 7,981,544; 8,389,160; 8,394,534; and 8,535,832, and the references therein. By "rare earth element" is meant the lanthanide elements from La to Lu, and Y and Sc. In another embodiment the cathode material is an NMC cathode; that is, a LiNiMnCoO cathode. More specifically, cathodes in which the atomic ratio of Ni:Mn:Co is 1:1:1 ($Li_aNi_{1-b-c}Co_bR_cO_{2-d}Z_d$ where $0.98 \le a \le 1.05$, $0 \le d \le 0.05$, $b=0.333$, $c=0.333$, where R comprises Mn) or where the atomic ratio of Ni:Mn:Co is 5:3:2 ($Li_aNi_{1-b-c}Co_bR_cO_{2-d}Z_d$ where $0.98 \le a \le 1.05$, $0 \le d \le 0.05$, $c=0.3$, $b=0.2$, where R comprises Mn).

In another embodiment, the cathode in the lithium ion battery disclosed herein comprises a composite material of the formula $Li_aMn_bJ_cO_4Z_d$, wherein J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and $0.9 \le a \le 1.2$, $1.3 \le b \le 2.2$, $0 \le c \le 0.7$, $0 \le d \le 0.4$.

In another embodiment, the cathode in the lithium ion battery disclosed herein comprises a cathode active material exhibiting greater than 30 mAh/g capacity in the potential range greater than 4.6 V versus a Li/Li$^+$ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode in the lithium ion battery disclosed herein comprises a composite material represented by the structure of formula:

$x(Li_{2-w}A_{1-v}Q_{w+v}O_{3-e}) \cdot (1-x)(Li_yMn_{2-z}M_zO_{4-d})$ wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5.
w is 0 to about 0.6;

M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure.

Alternatively, in another embodiment, in the Formula $x(Li_{2-w}A_{1-v}Q_{w+v}O_{3-e}) \cdot (1-x)(Li_yMn_{2-z}M_zO_{4-d})$ x is about 0 to about 0.1, and all ranges for the other variables are as stated above.

In another embodiment, the cathode in the lithium ion battery disclosed herein comprises:

$Li_aA_{1-x}R_xDO_{4-f}Z_f$, wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$0.8 \le a \le 2.2$;
$0 \le x \le 0.3$; and
$0 \le f \le 0.1$.

In another embodiment, the cathode in the lithium ion battery disclosed herein comprises a cathode active material which is charged to a potential greater than or equal to about 4.1 V, or greater than 4.35 V, or greater than 4.5 V, or greater than 4.6 V versus a Li/Li$^+$ reference electrode. Other examples are layered-layered high-capacity oxygen-release cathodes such as those described in U.S. Pat. No. 7,468,223 charged to upper charging potentials above 4.5 V.

A cathode active material suitable for use herein can be prepared using methods such as the hydroxide precursor method described by Liu et al (J. Phys. Chem. C 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of LiOH.H$_2$O at about 800 to about 1000° C. in oxygen for 3 to 24 hours. Alternatively, the cathode active material can be prepared using a solid phase reaction process or a sol-gel process as described in U.S. Pat. No. 5,738,957 (Amine).

Particles of the above cathode compositions may be coated with one or more of polymer, carbon, metal oxide, metal fluoride, or metal phosphate. Suitable coatings include, MgO, CaO, SrO, CeO$_2$, La$_2$O$_3$, TiO$_2$, Fe$_2$O$_3$, ZrO$_2$, MoO$_3$, MoO$_2$, ZnO, SiO$_2$, SnO$_2$, B$_2$O$_3$, Li$_2$O.2B$_2$O$_3$, Al$_2$O$_3$, LiAlO$_2$, Ga$_2$O$_3$, MnSiO$_4$, Li$_4$P$_2$O$_7$, Li$_3$PO$_4$, AlPO$_4$, Mg$_3$(PO$_4$)$_2$, CoPO$_4$, Zn$_3$(PO$_4$)$_2$BiOF, AlF$_3$, or combinations thereof. Other suitable coating materials include those compositions in the above list of cathode compositions.

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

A lithium ion battery as disclosed herein further contains an anode, which comprises an anode active material that is capable of storing and releasing lithium ions. Examples of suitable anode active materials include without limitation silicon, lithium metal, lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$, metal oxides such as $SnO_2$, SnO and $TiO_2$, nanocomposites containing antimony or tin, for example nanocomposites containing antimony, oxides of aluminum, titanium, or molybdenum, and carbon, such as those described by Yoon et al (Chem. Mater. 21, 3898-3904, 2009); and lithium titanates such as $Li_4Ti_5O_{12}$ and $LiTi_2O_4$. In one embodiment, the anode active material is lithium titanate, graphite, lithium alloys, silicon, and combinations thereof. In another embodiment, the anode is graphite. In one embodiment, the anode comprises an anode active material and the anode active material is lithium titanate or graphite.

An anode can be made by a method similar to that described above for a cathode wherein, for example, a binder such as a vinylidene fluoride-based copolymer, styrene-butadiene copolymer, or carboxymethyl cellulose is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi Chemical (Ibaraki, Japan), NEI Inc. (Somerset, N.J.), and Farasis Energy Inc. (Hayward, Calif.).

A lithium ion battery as disclosed herein also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. Patent Application Publication No. 2012/0149852, now U.S. Pat. No. 8,518,525.

The housing of the lithium ion battery hereof may be any suitable container to house the lithium ion battery components described above. Such a container may be fabricated in the shape of small or large cylinder, a prismatic case or a pouch.

The electrolyte compositions disclosed herein are useful in many types of electrochemical cells and batteries such as capacitors, nonaqueous batteries such as lithium batteries, flow batteries, and fuel cells.

The electrochemical cells and lithium ion battery disclosed herein may be used for grid storage or as a power source in various electronically-powered or -assisted devices ("electronic device") such as a computer, a camera, a radio or a power tool, various telecommunications devices, or various transportation devices (including a motor vehicle, automobile, truck, bus or airplane).

In another embodiment there is a provided a method to prepare an electrolyte composition. The method comprises combining:

a) the non-fluorinated carbonate;
b) the fluorinated solvent;
c) the lithium bis(malonato) borate;
d) the fluorinated carbonate; and
e) the electrolyte salt, as defined herein, to form an electrolyte composition. The step of combining can be accomplished by adding the individual components of the electrolyte composition sequentially or at the same time. The components can be combined in any suitable order. In some embodiments, the components a), b), c) and d) are combined to make a first solution. After the formation of the first solution, an amount of the electrolyte salt is added to the first solution to produce the electrolyte composition having the desired concentration of the electrolyte salt.

Typically, the electrolyte composition is stirred during and/or after the addition of the components in order to form a homogeneous mixture.

Examples

The meaning of abbreviations used is as follows: "g" means gram(s), "mg" means milligram(s), "μg" means microgram(s), "L" means liter(s), "mL" means milliliter(s), "mol" means mole(s), "mmol" means millimole(s), "M" means molar concentration, "wt %" means percent by weight, "mm" means millimeter(s), "ppm" means parts per million, "h" means hour(s), "min" means minute(s), "A" means amperes, "mA" mean milliampere(s), "mAh/g" mean milliamperes hour(s) per gram, "V" means volt(s), "×C" refers to a constant current which is the product of x and a current in A which is numerically equal to the nominal capacity of the battery expressed in Ah, "Pa" means pascal(s), "rpm" means revolutions per minute, "NMR" means nuclear magnetic resonance spectroscopy, "GC/MS" means gas chromatography/mass spectrometry.

Materials and Methods

Representative Preparation of 2,2-Difluoroethyl Acetate

The 2,2-difluoroethyl acetate (DFEA) used in the following Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent 19091S-433, 30 m, 250 μm, 0.25 μm; carrier gas —He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3 A molecular sieves, until water was not detectable by Karl Fischer titration (i.e., <1 ppm).

Synthesis of 2,2-dimethylmalonic Acid

In a round bottom flask, diethyl 2,2-dimethylmalonate (14.4 mL, 0.07569 mol), potassium hydroxide (42.471 g, 0.7569 mol), methanol (180 mL), and water (60 mL) were combined with a stir bar. Under nitrogen a reflux condenser was added and the reaction was refluxed 4 hours. Upon cooling to room temperature, about 100 mL ether and 50 mL water were added. The mixture was acidified with 10% HCl to pH 4. Extraction with three washes of ether was performed. The combined ether fractions were dried with magnesium sulfate and filtered. The ether was removed with a rotary evaporator and the resulting solid was dried overnight under high vacuum. 3.5 Grams of product were collected.

Synthesis of lithium tetramethanolatoboron

Glassware was dried overnight at 120° C. in an oven. The glassware was then brought into a nitrogen filled dry box. In a multineck flask, lithium methoxide (37.97 g, 0.1057 mol) and 50 mL anhydrous methanol were combined with a stir bar. The flask was sealed with a septum and brought out of the dry box. Under nitrogen a reflux condenser was added. The reaction was heated to 60° C. with an oil bath until the solution should become homogenous. Dropwise over 5 minutes, trimethyl borate (12.4 mL, 0.1110 mol) was added via syringe through the septum. The reaction was stirred overnight then allowed to cool to room temperature. The methanol was removed via syringe and the solid was dried under high vacuum at 35° C. The flask was sealed and brought into a dry box where 11.5 g product was collected.

Synthesis of lithium bis(2,2-dimethylmalonato) borate (Additive 1)

Glassware was dried overnight at 120° C. in an oven. The glassware was then brought into a nitrogen filled dry box. 2,2-dimethylmalonic acid (1.426 g, 0.01079 mol), lithium tetramethanolatoboron (1.531 g, 0.01079 mol) and 21 mL anhydrous acetonitrile (dried overnight with 3 A molecular sieves) were combined with a stir bar. The flask was sealed with a rubber septum and brought out of the dry box. Under flowing nitrogen, a Soxhlet Extraction apparatus was added which contained a coarse thimble packed with 4 A molecular sieves. An oil bath was added and the reaction was heated in stages to 115° C. for 72 hours. During the reaction another 60 mL anhydrous acetonitrile was added to make up for solvent held up in thimble. The reaction was cooled to room temperature and under flowing nitrogen the Soxhlet adapter was removed. The reactor was connected to a vacuum line equipped with a dry-ice trap and the acetonitrile solvent removed under reduced pressure.

The crude product was purified under nitrogen by adding 20 mL fresh/dry acetonitrile and heated to 45° C. After cooling to room temperature, the acetonitrile was removed via syringe to separate the insoluble material. This material was dried at 35° C. under high vacuum to yield 0.460 g of product.

Synthesis of lithium bis(malonato) borate (Additive 2)

This compound was prepared with malonic acid using the method of additive 1 described above. Isolated 1.2 g.

Synthesis of lithium bis(methylmalonato) borate (Additive 3)

This compound was prepared with methylmalonic acid using the method of additive 1 described above. Isolated 1.3 g.

Synthesis of lithium bis(ethylmalonato) borate (Additive 4)

This compound was prepared with 2,2-diethylmalonic acid using the method of additive 1 described above. Isolated 1.0 g.

Synthesis of lithium bis(phenylmalonato) borate (Additive 5)

This compound was prepared with phenylmalonic acid using the method of additive 1 described above. Isolated 1.99 g.

Synthesis of lithium bis(ethylmethylmalonato) borate (Additive 6)

This compound was prepared with ethylmethylmalonic acid using the method of additive 1 described above. Isolated 1.5 g.

Synthesis of lithium bis(allylmalonato) borate (Additive 7)

This compound was prepared with allylmalonic acid using the method of additive 1 described above. Isolated 0.82 g.

Representative Cathode Preparation
Representative Preparation of $LiMn_{1.5}Ni_{0.45}Fe_{0.05}O_4$ Cathode Active Material The following is a typical procedure used to prepare $LiMn_{1.5}Ni_{0.45}Fe_{0.05}O_4$ cathode active material. For the preparation, 401 g manganese (II) acetate tetrahydrate (Aldrich, Milwaukee Wis., Product No. 63537), 125 g nickel (II) acetate tetrahydrate (Aldrich, Product No. 72225) and 10 g iron (II) acetate anhydrous (Alfa Aesar, Ward Hill, Mass., Product No. 31140) were weighed into bottles on a balance, then dissolved in 5.0 L of deionized water. KOH pellets were dissolved in 10 L of deionized water to produce a 3.0 M solution inside a 30 L reactor. The solution containing the metal acetates was transferred to an addition funnel and dripped into the rapidly stirred reactor to precipitate the mixed hydroxide material. Once all 5.0 L of the metal acetate solution was added to the reactor, stirring was continued for 1 h. Then, stirring was stopped and the precipitate was allowed to settle overnight. After settling, the liquid was removed from the reactor and 15 L of fresh deionized water was added. The contents of the reactor were stirred, allowed to settle again, and the liquid was removed. This rinse process was repeated. Then, the precipitate was transferred to two (split evenly) coarse glass frit filtration funnels covered with Dacron® paper. The solids were rinsed with deionized water until the filtrate pH reached 6.0 (pH of deionized rinse water), and a further 20 L of deionized water was added to each filter cake. Finally, the cakes were dried in a vacuum oven at 120° C. overnight. The yield at this point was typically 80-90%.

The hydroxide precipitate was ground and mixed with lithium carbonate. This step was done in 50 g batches using a Pulverisette automated mortar and pestle (FRITSCH, Germany). For each batch the hydroxide precipitate was weighed, then ground alone for 5 min in the Pulveresette. Then, a stoichiometric amount with small excess of lithium carbonate was added to the system. For 50 g of hydroxide precipitate, 10.5 g of lithium carbonate was added. Grinding was continued for a total of 60 min with stops every 10-15 min to scrape the material off the surfaces of the mortar and pestle with a sharp metal spatula. If humidity caused the material to form clumps, it was sieved through a 40 mesh screen once during grinding, then again following grinding.

The ground material was fired in an air box furnace inside shallow rectangular alumina trays. The trays were 158 mm by 69 mm in size, and each held about 60 g of material. The firing procedure consisted of ramping from room temperature to 900° C. in 15 h, holding at 900° C. for 12 h, then cooling to room temperature in 15 h.

After firing, the powder was ball-milled to reduce particle size. Then, 54 g of powder was mixed with 54 g of isopropyl alcohol and 160 g of 5 mm diameter zirconia beads inside a polyethylene jar. The jar was then rotated on a pair of rollers for 6 h to mill. The slurry was separated by centrifugation, and the powder was dried at 120° C. to remove moisture.

Preparation of Primer on Aluminum Foil Current Collector—Using a Polyimide/Carbon Composite To prepare the polyamic acid, a prepolymer was first prepared. 20.6 wt 10% of PMDA:ODA prepolymer was prepared using a stoichiometry of 0.98:1 PMDA/ODA (pyromellitic dianhydride //ODA (4,4'-diaminodiphenyl ether) prepolymer). This was prepared by dissolving ODA in N-methylpyrrolidone (NMP) over the course of approximately 45 minutes at room temperature with gentle agitation. PMDA powder was slowly added (in small aliquots) to the mixture to control any temperature rise in the solution; the addition of the PMDA was performed over approximately two hours. The addition and agitation of the resulting solution under controlled temperature conditions. The final concentration of the polyamic acid was 20.6 wt % and the molar ratio of the anhydride to the amine component was approximately 0.98:1. In a separate container, a 6 wt % solution of pyromellitic anhydride (PMDA) was prepared by combining 1.00 g of PMDA (Aldrich 412287, Allentown, Pa.) and 15.67 g of NMP (N-methylpyrrolidone). 4.0 grams of the PMDA solution was slowly added to the prepolymer and the viscosity was increased to approximately 90,000 poise (as measured by a Brookfield 25 viscometer—#6 spindle). This resulted in a finished prepolymer solution in which the calculated final PMDA:ODA ratio was 1.01:1.5. 196 grams of the finished prepolymer was then diluted with 15.09 grams of NMP to create a 5 wt % solution. In a vial, 16.2342 grams of the diluted finished prepolymer solution was added to 0.1838 grams of TimCal 30 Super C-65 carbon black. This was further diluted with 9.561 grams of NMP for a final solids content of 3.4 wt %, with a 2.72 prepolymer: carbon ratio. A Paasche VL#3 Airbrush sprayer (Paasche Airbrush Company, Chicago, Ill.) was used to spray this material onto the aluminum foil (25 μm thick, 1145-0, Allfoils, Brooklyn Heights, Ohio). The foil was weighed prior to spraying to identify the necessary coating to reach a desired density of 0.06 mg/cm2. The foil was then smoothed onto a glass plate, and sprayed by hand with the airbrush until coated. The foil was then dried at 125° C. on a hot plate, and measured to ensure that the desired density was reached. The foil was found to be coated with 0.06 mg/cm$^2$ of the polyamic acid. Once the foil was dried and at the desired coating, the foil was imidized at 400° C. following the imidization procedure below:

40° C. to 125° C. (ramp at 4° C./min)
    125° C. to 125° C. (soak 30 min)
    125° C. to 250° C. (ramp at 4° C./min)
    250° C. to 250° C. (soak 30 min)
    250° C. to 400° C. (ramp at 5° C./min)
    400° C. to 400° C. (soak 20 min)

Preparation of the Paste

The following is a typical procedure used to prepare cathodes. The binder was obtained as a 5.5% solution of polyvinylidene fluoride in N-methylpyrrolidone (Solef® 5130 (Solvay, Houston, Tex.)). The following materials were used to make an electrode paste: 4.16 g $LiMn_{1.5}Ni_{0.45}Fe_{0.05}O_4$ cathode active powder as prepared above; 0.52 g carbon black (Denka uncompressed, DENKA Corp., Japan); 4.32 g PVDF (polyvinylidene difluoride) solution; and 7.76 g+1.40 g NMP (Sigma Aldrich). The materials were combined in a ratio of 80:10:10, cathode active powder:PVDF:carbon black, as described below. The final paste contained 28.6% solids.

The carbon black, the first portion of NMP, and the PVDF solution were first combined in a plastic vial and centrifugally mixed (ARE-310, Thinky USA, Inc., Laguna Hills, Calif.) two times, for 60 s at 2000 rpm each time. The cathode active powder and the 2nd portion of NMP were added and the paste was centrifugally mixed two times (2×1 min at 2000 rpm). The vial was placed in an ice bath and the rotor-stator shaft of a homogenizer (model PT 10-35 GT, 7.5 mm diameter stator, Kinematicia, Bohemia, N.Y.) was inserted into the vial. The gap between the vial top and the stator was wrapped with aluminum foil to minimize water ingress into the vial. The resulting paste was homogenized 30 for two times for 15 min each at 6500 rpm and then twice more for 15 min at 9500 rpm. Between each of the four homogenization periods, the homogenizer was moved to another position in the paste vial.

The paste was cast using doctor blades with a 0.41-0.51 mm gate height onto aluminum foil (25 μm thick, 1145-0, Allfoils, Brooklyn Heights, Ohio) using an automatic coater (AFA-II, MTI Corp., Richmond, Calif.). The electrodes were dried for 30 min at 95° C. in a mechanical convection oven (model FDL-115, Binder Inc., Great River, N.Y.). The resulting 51-mm wide cathodes were placed between 125 mm thick brass sheets and passed through a calender three times using 100 mm diameter steel rolls at ambient temperature with nip forces increasing in each of the passes, starting at 260 kg with the final pass at 770 kg.

Loadings of cathode active material were 7 to 8 mg/cm$^2$.

Representative Anode Preparation

The following is a typical procedure used to prepare anodes. An anode paste was prepared from the following materials: 5.00 g graphite (CPreme® G5, Conoco-Philips, Houston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid:PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 μm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 μm thick brass sheets and passed through a calender three times using 100 mm diameter steel rolls at ambient temperature with nip forces increasing in each of the passes, starting at 260 kg with the final pass at 770 kg.

Loadings of anode active material were 3 to 4 mg/cm$^2$.

Representative Coin Cells Fabrication

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard® Monolayer PP Battery Separator 2500 (Celgard®, Charlotte N.C.). The nonaqueous electrolytes used in the preparation of the coin cells are described in the following Comparative Examples and Examples.

Comparative Examples A-L and Examples 1-7

Preparation of Electrolyte Compositions

Ethylene carbonate, fluoroethylene carbonate, lithium hexafluorophosphate (LiPF$_6$) and NOVOLYTE® battery-grade electrolyte (ethyl methyl carbonate/ethylene carbonate 70/30 vol/vol) are available from BASF, Florham Park, N.J.

To prepare the electrolyte compositions of the Comparative Examples and the Examples, NOVOLYTE® electrolyte was used, or 2,2-difluoroethyl acetate was combined with the appropriate amount of ethylene carbonate, in a nitrogen purged dry box. Molecular sieves (3 A) were added to the solvent mixture to bring the water content to less than 1 ppm. Sufficient LiPF$_6$ was added to produce a 1.0 M solution of LiPF$_6$ in the dried solvent mixture. The additive indicated in Table 1 was then added to provide the final electrolyte composition.

High Temperature Performance of Coin Cells

The coin cells were cycled twice for formation using a commercial battery tester (Series 4000, Maccor, Tulsa, Okla.) at ambient temperature using constant current charging and discharging between voltage limits of 3.4-4.9 V at a current of 12 mA per gram of cathode active material, which is approximately a 0.1 C rate. The coin cells were placed in an oven at 55° C. and cycled using constant current charging and discharging between voltage limits of 3.4-4.9 V at a current of 240 mA per gram of cathode active material, which is approximately a 2 C rate.

The results are summarized in Table 1, which also provides the solvents and the weight percent of additives used. The column labelled "T80" shows the number of discharge/charge cycles needed for the cell to reach 80% of its initial capacity, and is a measure of cycle life durability. Higher values in the T80 column indicate longer cycle life durability.

TABLE 1

| Example | Solvent 70:30 | % FEC | Additive | Additive Amount | T80 | T° C. |
|---|---|---|---|---|---|---|
| Comp Ex A | EMC/EC | 2 | None | None | 99 | 55 |
| Comp Ex B | DFEA/EC | 2 | None | None | 116 | 55 |
| Comp Ex C | EMC/EC | 0 | Additive 1 | Saturated | 72 | 55 |
| Comp Ex D | DFEA/EC | 0 | Additive 1 | Saturated | 43 | 55 |
| Comp Ex E | EMC/EC | 2 | Additive 1 | Saturated | 72 | 55 |
| Comp Ex F | DFEA/EC | 0 | Additive 2 | Saturated | 35 | 55 |
| Comp Ex G | DFEA/EC | 0 | Additive 3 | Saturated | 49 | 55 |
| Comp Ex H | DFEA/EC | 0 | Additive 4 | Saturated | 52 | 55 |
| Comp Ex J | DFEA/EC | 0 | Additive 5 | Saturated | 47 | 55 |
| Comp Ex K | DFEA/EC | 0 | Additive 6 | Saturated | 56 | 55 |
| Comp Ex L | DFEA/EC | 0 | Additive 7 | Saturated | 54 | 55 |
| 1 | DFEA/EC | 2 | Additive 1 | Saturated | 242 | 55 |
| 2 | DFEA/EC | 2 | Additive 2 | Saturated | 247 | 55 |
| 3 | DFEA/EC | 2 | Additive 3 | Saturated | 110 | 55 |
| 4 | DFEA/EC | 2 | Additive 4 | Saturated | 80 | 55 |
| 5 | DFEA/EC | 2 | Additive 5 | Saturated | 96 | 55 |
| 6 | DFEA/EC | 2 | Additive 6 | Saturated | 259 | 55 |
| 7 | DFEA/EC | 2 | Additive 7 | Saturated | 234 | 55 |

DFEA—difluoroethyl acetate
EC—ethylene carbonate
EMC—ethyl methyl carbonate
FEC—fluoroethylene carbonate
Comp Ex—Comparative Example The results shown in the Table demonstrate that coin cells using the electrolyte compositions containing FEC alone, or an additive alone, have poor cycle life (43 to 116 cycles to T80). The combination of DFEA/EC with FEC and a lithium bis(malonato) borate shows that the lifetime is significantly enhanced in comparison to that of the Comparative Examples—a 1.5 to 7.1 times improvement.

What is claimed is:
1. An electrolyte composition comprising:
 a) a non-fluorinated carbonate selected from ethylene carbonate, propylene carbonate, and mixtures thereof;
 b) a fluorinated solvent comprising at least 2,2-difluoro-ethylacetate;

c) a lithium bis(malonato) borate compound selected from bis(2,2-dimethylmalonato) borate, bis(malonato) borate, bis(ethylmethylmalonato) borate, or bis(allylmalonato) borate;
d) a fluorinated carbonate different from the fluorinated solvent and which comprises fluoroethylene carbonate; and
e) an electrolyte salt.

2. The electrolyte composition of claim 1, wherein the non-fluorinated carbonate comprises ethylene carbonate.

3. The electrolyte composition of claim 1, wherein the fluorinated solvent further comprises:
a) a fluorinated acyclic carbonate represented by the formula:

$R^3-OCOO-R^4$, b) a fluorinated acyclic ether represented by the formula:

$R^5-O-R^6$, or a mixture thereof;
wherein
i) $R^3$ and $R^5$ is each independently a fluoroalkyl group and can be either the same as or different from each other;
ii) $R^4$, and $R^6$ is each independently an alkyl group or a fluoroalkyl group and can be either the same as or different from each other; and
iii) $R^3$ and $R^4$, and $R^5$ and $R^6$, each taken as a pair, comprise at least two carbon atoms but not more than seven carbon atoms.

4. The electrolyte composition of claim 3, wherein $R^3$ and $R^4$, and $R^5$ and $R^6$, each taken as a pair, further comprise at least two fluorine atoms, with the proviso that none of $R^3$, $R^4$, $R^5$, nor $R^6$ contains a —$CH_2F$ or —CHF— group.

5. The electrolyte composition of claim 1, wherein the fluorinated solvent further comprises $CH_3CH_2$—$COOCH_2CF_2H$, $F_2CHCH_2$—COO—$CH_3$, $F_2CHCH_2$—COO—$CH_2CH_3$, $CH_3$—COO—$CH_2CH_2CF_2H$, $CH_3CH_2$—COO—$CH_2CH_2CF_2H$, $F_2CHCH_2CH_2$—COO—$CH_2CH_3$, $CH_3$—$COOCH_2CF_3$, $CH_3CH_2$—COO—$CH_2CF_2H$, or mixtures thereof.

6. The electrolyte composition of claim 1, wherein the electrolyte composition comprises about 0.5 weight percent to about 5 weight percent of a cyclic fluorinated carbonate and 0.01 weight percent to 5 weight percent of a lithium bis(malonato) borate, based on the weight of the electrolyte composition.

7. An electrochemical cell comprising:
(a) a housing;
(b) an anode and a cathode disposed in the housing and in ionically conductive contact with one another;
(c) the electrolyte composition of claim 1 disposed in the housing and providing an ionically conductive pathway between the anode and the cathode; and
(d) a porous separator between the anode and the cathode.

8. The electrochemical cell of claim 7, wherein the electrochemical cell is a lithium ion battery.

9. The electrochemical cell of claim 8, wherein the anode comprises an anode active material and the anode active material is lithium titanate or graphite.

10. The electrochemical cell of claim 8, wherein the cathode comprises a cathode active material exhibiting greater than 30 mAh/g capacity in the potential range greater than 4.6 V versus a Li/Li+ reference electrode.

11. The electrochemical cell of claim 8, wherein the cathode comprises a cathode active material which is charged to a potential greater than or equal to 4.35 V versus a Li/Li+ reference electrode.

12. The electrochemical cell of claim 8, wherein the cathode active material comprises:
a) a lithium-containing manganese composite oxide having a spinel structure as active material, the lithium-containing manganese composite oxide comprising oxides of the formula $Li_xNi_yM_zMn_{2-y-z}O_{4-d}$ wherein x is 0.03 to 1.0; x changes in accordance with release and uptake of lithium ions and electrons during charge and discharge;
y is 0.3 to 0.6; M comprises one or more of Cr, Fe, Co, Li, Al, Ga, Nb, Mo, Ti, Zr, Mg, Zn, V, and Cu;
z is 0.01 to 0.18, and
d is 0 to 0.3; or
b) a composite material represented by the formula:

$x(Li_{2-w}A_{1-v}Q_{w+v}O_{3-e})\cdot(1-x)Li_yMn_{2-z}M_zO_{4-d}$ wherein:
x is about 0 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5;
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1;
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure; or
c) a composition of the formula $Li_aNi_bMn_cCo_dReO_{2-f}Z_f$, wherein:
R is Al, Ni, Co, Mn, Cr, Fe, Mg, Sr, V, Zr, Ti, a rare earth element, or a combination thereof, and Z is F, S, P, or a combination thereof; and 0.8≤a≤1.2, 0.1≤b≤0.9, 0.0≤c≤0.7, 0.05≤d≤0.4, 0≤e≤0.2; wherein the sum of b+c+d+e is about 1; and 0≤f≤0.08; or
d) a composition of the formula $Li_aA_{1-x}R_xDO_{4-f}Z_f$, wherein:
A is Fe, Mn, Ni, Co, V, or a combination thereof; R is Al, Ni, Co, Mn, Cr, Fe, Mg, Sr, V, Zr, Ti, a rare earth element, or a combination thereof; D is P, S, Si, or a combination thereof; Z is F, Cl, S, or a combination thereof;
0.8≤a≤2.2;
0≤x≤0.3; and
0≤f≤0.1; or
e) a composition of the formula $Li_aA_{1-b}R_bD_2$, wherein:
A is Ni, Co, Mn, or a combination thereof;
R is Al, Ni, Co, Mn, Cr, Fe, Mg, Sr, V, Zr, Ti, a rare earth element, or a combination thereof;
D is O, F, S, P, or a combination thereof; and
0.90≤a≤1.8 and 0≤b≤0.5.

13. An electronic device, transportation device, or telecommunications device, comprising the electrochemical cell of claim 7.

14. A method comprising combining:
a) a non-fluorinated carbonate selected from ethylene carbonate, propylene carbonate, and mixtures thereof;
b) a fluorinated solvent comprising at least 2,2-difluoroethylacetate;
c) a lithium bis(malonato) borate compound selected from bis(2,2-dimethylmalonato) borate, bis(malonato) borate, bis(ethylmethylmalonato) borate, or bis(allylmalonato) borate;
d) a fluorinated carbonate different from the fluorinated solvent and which comprises fluoroethylene carbonate; and
e) an electrolyte salt;
to form an electrolyte composition.

* * * * *